United States Patent [19]
Ernst et al.

[11] 4,093,053
[45] June 6, 1978

[54] SLIDING COLLAR

[75] Inventors: Horst Manfred Ernst, Eltingshausen; Armin Olschewski, Schweinfurt; Rainer Schürger, Schwanfeld; Lothar Walter, Schweinfurt; Manfred Brandenstein, Aschfeld; Erich Burkl, Stammheim, all of Germany

[73] Assignee: SKF Kugellagerfabriken GmbH, Schweinfurt, Germany

[21] Appl. No.: 783,064

[22] Filed: Mar. 30, 1977

[30] Foreign Application Priority Data

Mar. 31, 1976 Germany .................. 7609872[U]

[51] Int. Cl.² ................... F16D 19/00; F16D 13/60
[52] U.S. Cl. ................... 192/98; 192/111 R; 192/107 R
[58] Field of Search ........... 192/98, 111 R, 107 R, 192/107 M, 110 B, 70.25

[56] References Cited

FOREIGN PATENT DOCUMENTS 1,228,504  4/1971  United Kingdom .................. 192/98

Primary Examiner—Edgar W. Geoghegan
Attorney, Agent, or Firm—Daniel M. Rosen

[57] ABSTRACT

A siding collar is provided for a fork-activated coupling clutch release bearing, including a collar body with a cast-in wear-resistant disc formed on a radial flange. A plurality of contact zones on one side of the disc contact the fork. On the bearing side of the disc the nonrotating bearing ring contacts the disc, the disc having a plurality of guide zones running essentially axially along the edge, with means for securing this bearing ring to the collar having guide zones for holding this bearing ring on the sliding collar against rotation on the sliding collar.

8 Claims, 4 Drawing Figures

SLIDING COLLAR

The novelty concerns a sliding collar for use in coupling clutch release bearings. In conventional construction, a collar body is provided with cast-in wearing disc, the collar body being made by the die casting method, and having a one-piece radial flange.

A sliding collar for clutch release bearings, made by the die casting method, is known. In such constructions, a wear-resistant ring is cast in the collar for the purpose of providing a wear-resistant contact surface with the clutch actuation fork. Such a sliding collar has the disadvantage that the clutch release bearings lie against the radial flange. Since the radial flange is usually constructed of a relatively soft die casting material, for example, aluminum, this flange wears down at the areas of contact with the clutch release bearing through contact wear and rapidly becomes unusable.

To eliminate this disadvantage it is possible to cast in a wear-resistant ring or a wear-resistant disc in the sliding collar, not only at the contact surfaces with the fork, but also at the contact surfaces with the clutch release bearing. However, this step requires additional expenditure in the die casting, for the two wear-resistant rings or discs would have to be kept at a distance from each other and with a correct relative position for the formation of the contact surfaces with the fork or with the clutch release bearing. For this reason the production of a sliding collar with two cast-in wear-resistant rings or discs is uneconomical.

Another disadvantage of the known sliding collars is that the bearing, or more particularly, the nonrotating bearing ring, cannot be easily secured against rotational movement on the sliding collar. In this case, stop protrusions or stop washers on the bearing which interlock with corresponding recesses in the radial flange constitute holding means to prevent rotational movement. These are in contact directly against the body of the collar which is made of a relatively soft cast material and thus cause a harmful wear due to the constant activation of the coupled clutch release bearing. This is particularly evident when the bearing or the bearing rings are self-centering, and thus have a radial play with regard to the sliding collar, thereby moving radially when in operation.

It is therefore the prime object of the present invention to provide a sliding collar as described above which is wear-resistant at its contact surfaces with the fork and with the bearing, and whereby the nonrotating bearing ring of the bearing is held securely on the sliding collar against rotational movement.

The foregoing object is achieved in accordance with the present invention by providing a wear-resistant disc, on the side of the fork as well as on the side of the bearing's contact zones with essentially axially running guide zones on the sliding collar for holding the bearing on the sliding collar secure against rotational movement.

In accordance with a preferred embodiment of the present invention, the guide zones are directly connected to the contact zones of the wear-resistant disc. The guide zones can be formed by one-piece axial fins or by axially inverted holes (meaning holes with raised edges) on the wear-resistant disc. The fins or holes with raised edges provided on the wear-resistant disc serve to hold the nonrotating part of the bearing firmly on the sliding collar through axial projections or similar means of this part contacting the axially running guide zones of the fins or holes in the direction of the circumference thus preventing a rotational movement of the part on the disc. The fins or holes in the die casting also provide advantageously solid anchoring of the wear-resistant disc in the cast material sliding collar. When cooled after casting, the sliding collar exhibits no loosening or deformation of this disc otherwise resulting from differential heat expansion between the collar body and the cast-in wear-resistant disc.

According to a further embodiment of the present invention, the contact zones of the wear-resistant disc on the side of the fork and on the side of the bearing are located on the corresponding surface of the radial flange. Thus, when casting, the wear-resistant disc can be held at the contact zones of the radial flange without any special supports being provided, such as locking pins, for holding and adjusting said disc.

According to an additional feature of the present invention, the wear-resistant disc is made of sheet iron or steel, without cutting, so that the production is extremely economical especially when made in large numbers.

Finally, the collar body can be made of light metal, for example, cast aluminum.

The foregoing objects and brief description will become more apparent from the following more detailed description and appended drawings, wherein.

Figure 2:
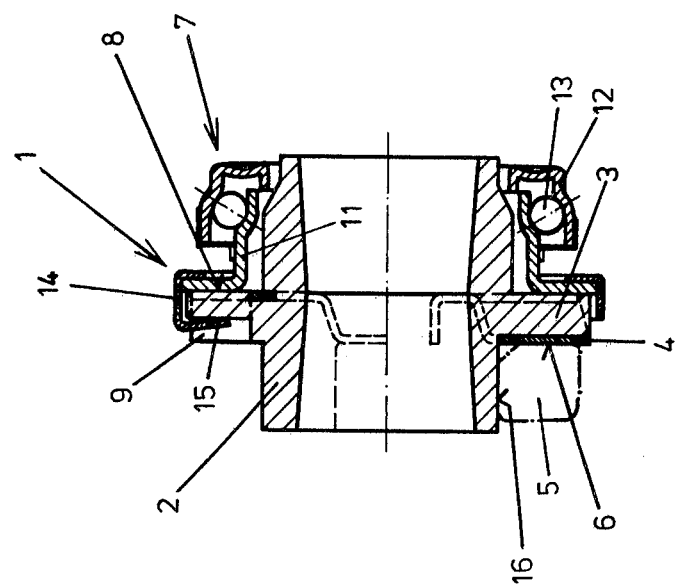
FIG. 2 illustrates a cross-section along the line A—A through the sliding collar of FIG. 1 with the bearing in place.
Figure 1:
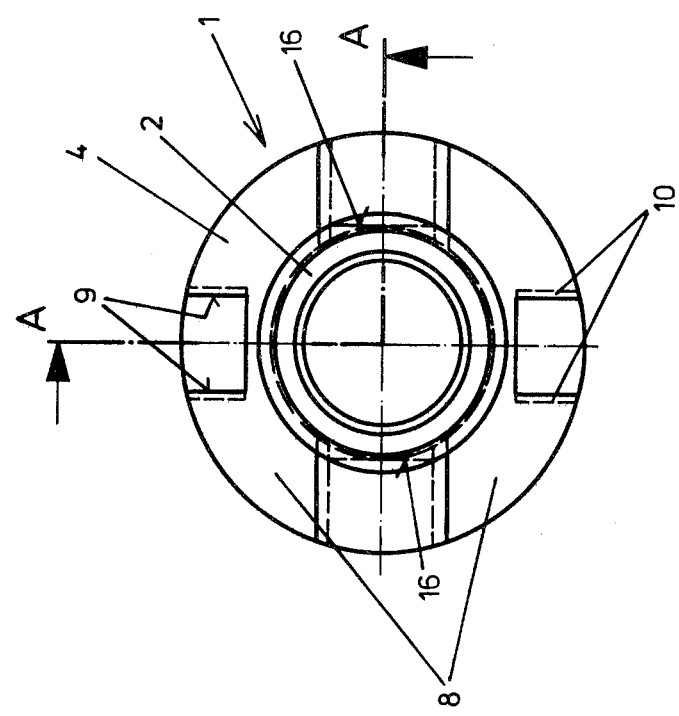
FIG. 1 shows the side of a sliding collar turned towards the bearing, in accordance with the present invention.

Referring now to FIGS. 1 and 2, a sliding collar 1 is shown with a collar body 2, produced by pressure casting, a one-piece radial flange 3, and a wear-resistant disc 4, cast in the collar body 2. The wear-resistant disc is made, for example, of noncut formed iron or steel plate. The contact zones 6 lying on the side of the fork 5 (shown in FIG. 2 by dotted lines) and the contact zones 8 of the wear-resistant disc 4, lying at the side of the bearing 7, are placed at the corresponding surfaces of the radial flange 3. The guide zones 9 are formed by one-piece axial fins 10 of the wear-resistant disc 4, which connect directly with the contact zones 8 lying at the side of the bearing 7. The bearing 7 is fastened on to the sliding collar 1 and includes a nonrotating inner bearing ring 11, a rotating outer bearing ring 12, and rotating bodies 13 positioned therebetween. The nonrotating inner bearing ring 11 is movable radially within certain limits (self-centering) by a retainer ring 14 which, with its springy tongues 15, engages the axial recess of the radial flange 3 between the guide zones 9 of the wear-resistant disc 4, and is axially clamped on to the sliding collar 1. The tongues 15 of the retainer ring 14 are led sidewise to the guide zones 9 and thus secured against rotating on the sliding collar 1.

The collar body 2 is made by pressure casting of a preferably light metal, for example, pressure cast aluminum, so that the sliding collar 1 with the cast-in thin-walled wear-resistant disc 4 of sheet iron or steel has a relatively low weight. In the same manner, the forces due to the inertia of the sliding collar 1 that are to be overcome at the activation of the bearing 7 by the fork 5 (shown in dotted lines in FIG. 2) are small and harmless. Further, the fork 5 contacts two radially oppositelying flattened areas 16 on the outer diameter of the sliding collar 1, in order to hold the sliding collar 1 against rotating, in a known manner.

Figure 4:
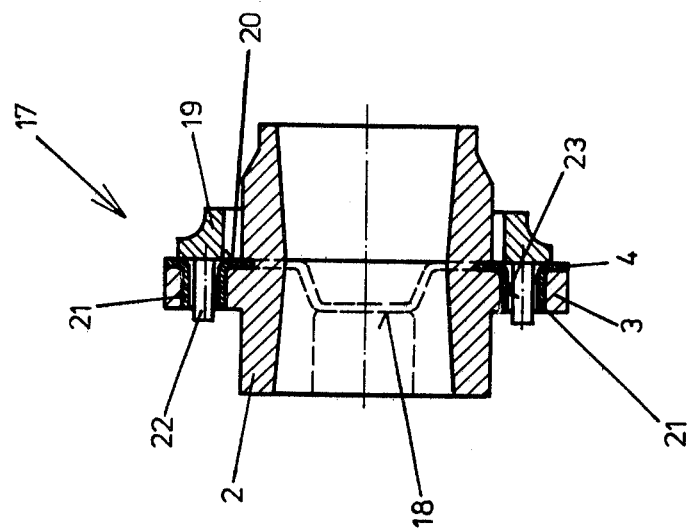
FIG. 4 illustrates a cross-section along the line B—B through the sliding collar shown in FIG. 3 with the nonrotating part of the bearing associated therewith.
Figure 3:
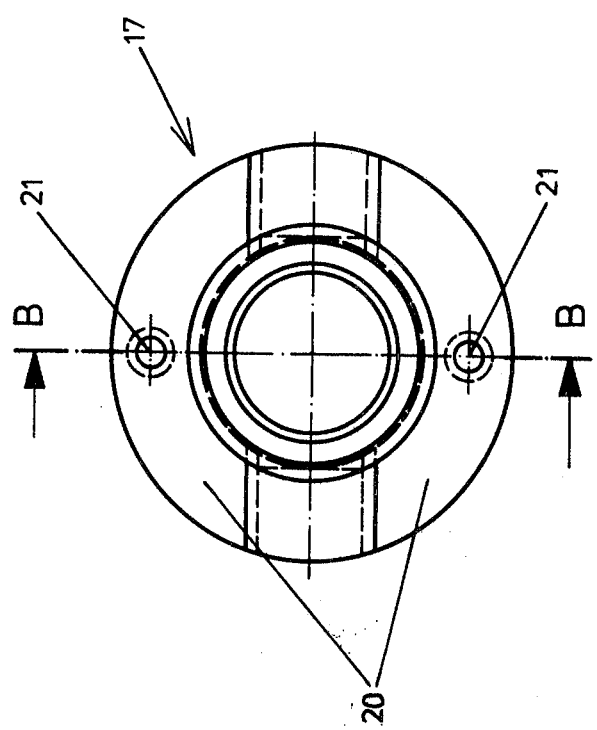
FIG. 3 shows an alternative embodiment sliding collar with the side turned toward the bearing.

Referring now to FIG. 3, the side, turned toward the bearing, of a novel sliding collar 17 is shown. In FIG. 4 a cross-section through the sliding collar 17 with installed non-rotating inner bearing ring 19 is also shown. As in the above described embodiment of the inventive sliding collar 1, a wear-resistant disc 4 of iron or steel plate is cast into the collar body 2 with a radial flange 3. The wear resistant disc 4, at the side of the fork (not shown), is provided with contact zones 18, and on the side of the bearing ring 19 with contact zones 20. Moreover, an axially inverted hole such as the hole 21 with raised edges is made in the contact zones 20 on the side of the inner bearing ring 19. Two axial, diametrically opposed projections 22 of the inner bearing ring 19 engage the holes 21 with little radial play so that the inner bearing ring is held on the sliding collar 17 in such a manner that is cannot rotate, but retains a small radial sliding movement, for self-centering. In this manner, the axially running guide zones 23 in the bore of the holes 21 serve as holding guidance for the projections 22.

The sliding collar 1 shown in FIGS. 1,2 or 17 shown in FIGS. 2,3, in accordance with the present invention, thus has the great advantage that the contact spots of the sliding collars 1,17 transmitting operating force with the clutch release bearing and with the fork are formed through wear-resisting zones 6, 8, 18, 20 of a single wear-resistant disc 4. The sliding collar 1,17 can be produced simply and economically by known pressure casting methods with a cast-in wear-resistant disc 4.

Other alternatives, alterations, additions, modifications and substitutions will be apparent to one skilled in the art within the spirit and scope of the present invention.

What is claimed is:

1. In a sliding collar for a fork-activated coupling clutch release bearing, including a collar body with a cast-in wear-resistant disc formed on a radial flange of said collar, the improvement comprising a plurality of contact zones on said wear-resistant disc on the fork side of said disc for contacting said fork and on the bearing side of said disc for contacting the nonrotating bearing ring of the bearing, a plurality of guide zones essentially axially running along the edge of said disc, and means securing said bearing to said collar having guide zones for holding said bearing ring on said sliding collar against rotation on the sliding collar.

2. The sliding collar of claim 1, wherein said guide zones lie directly against said bearing side contact zones of said wear-resistant disc.

3. The sliding collar of claim 2, wherein said guide zones are formed by one-piece axial fins.

4. The sliding collar of claim 2, wherein said guide zones are formed by axial holes with raised edges.

5. The sliding collar of claim 1, wherein said fork side contact zones on the side of said fork are located on the corresponding surface of said radial flange.

6. The sliding collar according to claim 1, wherein said contact zones lying on the side of said bearing are located on the corresponding surface of said radial flange.

7. The sliding collar according to claim 1, wherein said wear-resistant disc is formed of noncut iron or steel sheet.

8. The sliding collar according to claim 1, wherein said collar body is made of a light metal.

* * * * *